United States Patent
Moll et al.

(10) Patent No.: US 9,563,560 B2
(45) Date of Patent: Feb. 7, 2017

(54) ADAPTIVE TUNING OF SNOOPS

(71) Applicant: QUALCOMM TECHNOLOGIES, INC., San Diego, CA (US)

(72) Inventors: Laurent Moll, San Jose, CA (US); Jean-Jacques Lecler, Sunnyvale, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 67 days.

(21) Appl. No.: 13/938,675

(22) Filed: Jul. 10, 2013

(65) Prior Publication Data
US 2014/0095808 A1 Apr. 3, 2014

Related U.S. Application Data

(60) Provisional application No. 61/707,627, filed on Sep. 28, 2012.

(51) Int. Cl.
*G06F 12/08* (2016.01)

(52) U.S. Cl.
CPC ....... *G06F 12/0831* (2013.01); *G06F 12/0833* (2013.01)

(58) Field of Classification Search
None
See application file for complete search history.

(56) References Cited

U.S. PATENT DOCUMENTS

| | | | |
|---|---|---|---|
| 5,317,720 A | 5/1994 | Stamm et al. | |
| 5,611,074 A | 3/1997 | Kantz et al. | |
| 6,681,292 B2 * | 1/2004 | Creta et al. | 711/119 |
| 7,174,430 B1 * | 2/2007 | O'Krafka et al. | 711/141 |
| 8,296,525 B1 * | 10/2012 | O'Bleness et al. | 711/146 |
| 2002/0087811 A1 | 7/2002 | Khare et al. | |
| 2003/0120876 A1 * | 6/2003 | Hass | G06F 12/0813 711/146 |
| 2005/0132148 A1 | 6/2005 | Arimilli et al. | |
| 2005/0160240 A1 * | 7/2005 | Van Doren et al. | 711/146 |
| 2006/0190661 A1 | 8/2006 | Ogilvie et al. | |
| 2006/0224835 A1 | 10/2006 | Blumrich et al. | |
| 2006/0230237 A1 | 10/2006 | Sakamoto | |
| 2007/0005909 A1 * | 1/2007 | Cai et al. | 711/146 |

(Continued)

FOREIGN PATENT DOCUMENTS

GB 2460337 A 12/2009

OTHER PUBLICATIONS

"Bandwidth Adaptive Snooping," Proceedings of the Eighth International Symposium on High-Performance Computer Architecture, 2002. pp. 251, 262, Feb. 2-6, 2002.*

(Continued)

*Primary Examiner* — Brian Peugh
*Assistant Examiner* — Dustin Bone
(74) *Attorney, Agent, or Firm* — Muncy, Geissler, Olds & Lowe, P.C.

(57) ABSTRACT

A coherency controller, such as one used within a system-on-chip, is capable of issuing different types of snoops to coherent caches. The coherency controller chooses the type of snoop based on the type of request that caused the snoops or the state of the system or both. By so doing, coherent caches provide data when they have sufficient throughput, and are not required to provide data when they do not have insufficient throughput.

15 Claims, 2 Drawing Sheets

(56) References Cited

U.S. PATENT DOCUMENTS

| | | |
|---|---|---|
| 2007/0038814 A1 | 2/2007 | Dieffenderfer et al. |
| 2007/0130382 A1 | 6/2007 | Moll et al. |
| 2008/0209133 A1 | 8/2008 | Ozer et al. |
| 2010/0005246 A1* | 1/2010 | Beers ................ G06F 12/0831 711/146 |
| 2010/0058000 A1 | 3/2010 | Moyer et al. |
| 2010/0064108 A1* | 3/2010 | Harris et al. .................. 711/146 |
| 2010/0185821 A1* | 7/2010 | Paver et al. .................. 711/146 |
| 2010/0287342 A1 | 11/2010 | Greenberg et al. |
| 2011/0145506 A1 | 6/2011 | Cherukuri et al. |
| 2013/0042077 A1 | 2/2013 | Mannava et al. |
| 2014/0095807 A1 | 4/2014 | Moll et al. |
| 2014/0095809 A1 | 4/2014 | Moll et al. |
| 2014/0108744 A1 | 4/2014 | Moll |

OTHER PUBLICATIONS

Bandwidth. (2003). In B. Pfaffenberger, Webster's New World Computer Dictionary. Hoboken, NJ: Wiley. Retrieved from http://search.credoreference.com/content/entry/webstercom/bandwidth/0.*

* cited by examiner

ADAPTIVE TUNING OF SNOOPS

CROSS REFERENCE

This application claims priority under 35 USC 119 from U.S. Provisional Application Ser. No. 61/707,627 filed on Sep. 28, 2012, titled SIMPLIFIED CONTROLLER WITH PARTIAL COHERENCY by inventor Laurent Moll, the entire disclosure of which is incorporated herein by reference.

FIELD OF THE INVENTION

The disclosed invention is related to semiconductors and, more specifically, to coherency for caches in data processing semiconductor chips.

BACKGROUND

Cache coherency is used to maintain the consistency of data in a shared memory system. A number of initiators, at least one comprising one or more caches, are connected together through a fabric or a central cache coherency controller. This allows the initiators to take advantage of the performance benefit of caches while still providing a consistent view of data across initiators.

Cache coherency protocols are usually based on acquiring and releasing permissions on sets of data (e.g. 32 or 64 bytes), typically called cache lines. Typical permissions are:
  None: the cache line is not in the initiator and the initiator has no permission to read or write the data.
  Readable: the cache line is in the initiator and the initiator has permission to read the cache line content stored locally. Multiple initiators can simultaneously have read permission on a cache line (i.e. multiple readers).
  Readable and writable: the cache line is in the initiator and the initiator has permission to write (and typically read) the cache line content. Only one initiator can have write permission on a cache line, and no initiator can have read permission at the same time.

There is usually a backing store for all cache lines (e.g. a DRAM), which is a target of the fabric or coherency controller. The backing store is the location where the data is stored when it is not in any of the caches. At any point in time, the data in the backing store may not be up to date with respect of the latest copy of a cache line, which may be in an initiator. Because of this, cache lines inside initiators often include an indication of whether the cache line is clean (i.e. it has the same value as in the backing store) or dirty (i.e. it needs to be written back to the backing store at some point as it is the most up-to-date version).

The permission and "dirtiness" of a cache line in an initiator is referred to as the "state" of the cache line. The most common set of coherency states is called MESI (Modified-Exclusive-Shared-Invalid), where Shared corresponds to the read permission (and the cache line being clean) and both Modified and Exclusive give read/write permissions, but in the Exclusive state, the cache line is clean, while in the Modified state, the cache line is dirty and must be eventually written back. In that state set, shared cache lines are always clean.

There are more complex sets of coherency states like MOESI (Modified-Owned-Exclusive-Shared-Invalid) where cache lines with read permission are allowed to be dirty.

Other protocols may have separate read and write permissions. Many cache coherency state sets and protocols exist.

In the general case, when an initiator needs a permission on a cache line that it does not have, it must interact with other initiators directly or through a cache coherency controller to acquire the permission. In the simplest "snoop-based" protocols, the other initiators must be "snooped" to make sure that the permission requested by the initiator is consistent with the permissions already owned by the other initiators. For instance, if a first initiator requests read permission and no other initiator has write permission, the read permission can be granted. However, if a second initiator already has write permission, that permission must be removed from that initiator first before it is granted to the original requester.

In some systems, initiators directly issue snoop requests on a bus and all initiators (or at least all other initiators) respond to the snoop requests. In other systems, the initiators issue permission requests to a coherency controller, which in turn snoops the other initiators (and possibly the requesting initiator itself).

In "directory-based" protocols, directories of permissions acquired by initiators are maintained and snoop requests are sent only when permissions need to change in an initiator.

Snoop filters may also be used to reduce the number of snoop requests sent to initiators. A snoop filter keeps a coarse view of the content of the initiators and don't send a snoop request to an initiator if the snoop filter knows that the initiator does not need to change its permissions.

Data and permissions interact in cache coherency protocols, but the way they interact varies. Initiators usually issue requests for both permission and data simultaneously, but not always. For instance, an initiator that wants to place data in its cache for reading purposes and has neither the data nor the permission can issue a read request including both the request for permission and for the data itself. However, an initiator that already has the data and read permission but needs write permission may issue an "upgrade" request to write permission, but does not need data.

Likewise, responses to snoop requests can include acknowledgments that the permission change has happened, but can also optionally contain data. The snooped initiator may be sending the data as a courtesy. Alternatively, the snooped initiator may be sending dirty data that has to be kept to be eventually written back to the backing store.

Initiators with caches can hold permission without data. For instance, an initiator that wants to write a full cache line may decide not to request data with the write permission, as it knows it will not use it (it will override it completely). In some systems, holding partial data is permitted (in sectors, per byte . . . ). This is useful to limit data transfers but it makes the cache coherency protocol more complex.

Many cache coherency protocols provide two related ways for data to leave an initiator. One is through the snoop response channel, providing data as a response to a snoop. The other is a spontaneous write channel (often called write back or evict channel) where the initiator can send the data out when it does not want to keep it anymore. In some protocols, the snoop response channel and write back channel are shared.

Fully coherent initiators are capable of both owning permissions for cache lines and receiving snoop requests to check and possibly change their permissions, as triggered by requests from another initiator. A common type of fully coherent initiator is a microprocessor with a coherent cache. As the microprocessor needs to do reads and writes, it acquires the appropriate permissions and potentially data and puts them in its cache. Many modern microprocessors have multiple levels of caches inside. Many modern microprocessors contain multiple microprocessor cores, each with a cache and often a shared second-level cache. Many other types of initiators may be fully coherent such as DSPs, GPUs and various types of multimedia initiators comprising a cache.

In contrast, I/O coherent (also called one-way coherent) initiators do not use a coherent cache, but they need to operate on a consistent copy of the data with respect to the fully coherent initiators. As a consequence, their read and write request may trigger snoops to fully coherent initiators. In most cases, this is done by having either a special bridge or the central coherency controller issue the appropriate coherency action and sequence the actual reads or writes to the backing store if necessary. In the case of a small bridge, that bridge may act as a fully coherent initiator holding permissions for a small amount of time. In the case of the central coherency controller, it tracks the reads and writes, and prevents other initiator from accessing cache lines that are being processed on behalf of the I/O coherent initiator.

In cache coherency systems, when data is requested by an initiator, it can be provided either by one of the other initiators (if they have a cache containing the data) or by the backing store target (or another cache on the way to the backing store). It is normally advantageous to try to obtain data from another initiator as this reduces the throughput and therefore power needed from the backing store, which is often a bottleneck in the system (e.g. when the backing store is external DRAM). Because of this, cache coherency systems are often tuned to obtain data from other initiators as much as possible.

However, in some cases, the other initiators may not have enough throughput to provide data on a continuous basis. Usually, the data request is done in conjunction with a snoop request or implicit within a snoop request. While initiators can typically handle a large amount of snoop requests when no data needs to be transferred (for instance, they can handle one snoop request per cycle when they do not have the snooped data), they can handle many fewer snoop requests when they have to provide data (for instance, 1 snoop every four cycles). This is particularly a problem when the required snoop data throughput is high or the initiators with coherent caches are running at a lower-than-peak clock frequency.

Therefore, what is needed is a coherency system where initiators with coherent caches may be asked to provide data when they have enough throughput to do so, and asked not to provide data, if allowed by the protocol, when they do not have enough available throughput to do so.

SUMMARY OF THE INVENTION

According to the disclosed invention, a cache coherency controller, in response to requests from an initiator, issues snoops to one or more connected initiators with caches. An initiator with or without its own cache can make the request. The request begins the process according to the invention.

The snoops can be of different types. The type of the snoop affects whether the initiators, if they contain the snooped data, provide the data with their snoop response. If the snoop response does not contain data then the coherency controller gets the data from a snoop of another cache or requests the data from a backing store target. By doing so, the disadvantageous consumption of data transfer throughput to the caches of some initiators is avoided.

While ensuring compliance with the requirements of a coherency protocol, the dynamic choice of snoops enables balancing and optimization of the use of system resources such as throughput between the coherency controller and caches and throughput between the coherency controller and one or more backing store targets.

DETAILED DESCRIPTION

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
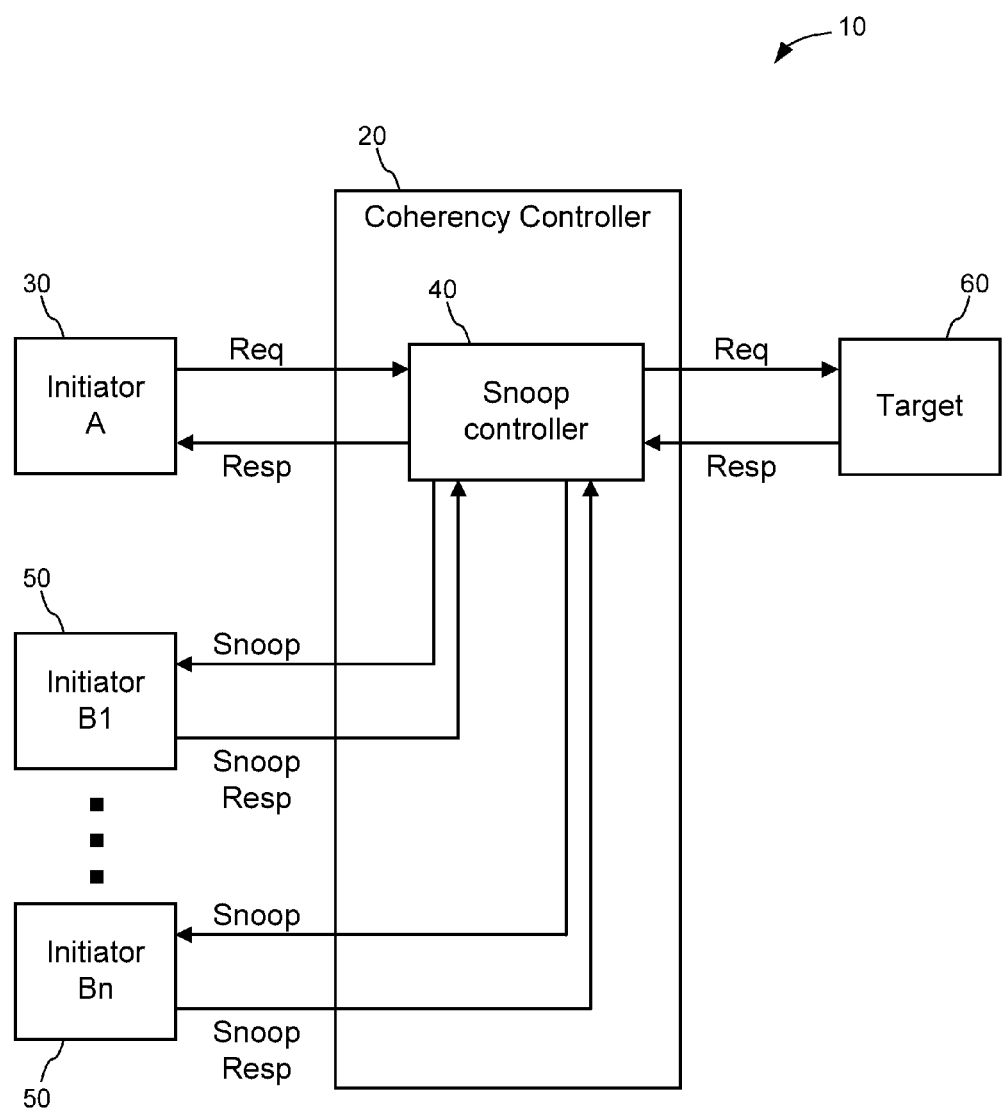
FIG. 1 illustrates a system with a coherence controller according to the various aspects and teachings of the present invention.

FIG. 1 shows a system 10 that includes an initiator 30 enabled to issue a request to a coherency controller 20, the coherency controller 20 being in accordance with various aspects of the present invention. The coherency controller 20 includes a snoop controller 40. To service the request from the initiator 30, the snoop controller 40 must send snoop requests to coherent initiators 50. While permission can only be obtained by snooping coherent initiators 50, if the cache line is in a coherent initiator, but not in a modified state, then the data can be obtained either from coherent initiators 50 or from a target 60. A cache line, according to the present invention, is a unit of information accessed within a cache and in accordance with the teaching of the present invention, the cache line can vary in size. Furthermore, different initiators and targets within the system 10 can have different cache line sizes.

According to the various aspects of the present invention, the coherency controller 20 makes a choice as to which type of snoop to send to the cache of each coherent initiator 50. There are many elements of state within the system 10 that can be used to affect the choice. Some, but certainly not all, are enumerated below based on the various aspects of the present invention.

In accordance with one aspect of the present invention, the coherency controller 20 uses the value of a dedicated register to determine the type of snoop to send to each of one or more caches in the system 10. The register is programmable by software. In an alternative aspect of the present invention, the register is set by a hardware function.

In accordance with another aspect of the present invention, the coherency controller 20 uses an attribute of the request to determine the type of snoop to send to each of one or more caches in the system 10. In accordance with one aspect of one embodiment, the attribute is the type (opcode) of request. This implies a one-to-one mapping of request types to snoop types. In accordance with another aspect, the attribute of the request is the identity of the initiator 30. In accordance with yet another aspect, the attribute of the request is a user bit. The user bit indicates that the initiator 30 knows itself to be the last consumer of the cache line and the user bit causes a choice of a snoop that causes a deallocation of the cache line in the cache.

In accordance with an aspect of the present invention, the coherency controller 20 uses the frequency of a clock signal to determine the type of snoop to send to each of one or more caches in the system 10. In accordance with another aspect of the present, the coherency controller 20 uses the frequency of a clock and the width of a data bus to determine an available snoop response throughput.

In accordance with various aspects of the present invention, the coherency controller 20 includes a monitor and uses a value output from the monitor to determine the type of snoop to send to each of one or more caches. The monitor is an incrementer/decrementer that represents the number of pending snoops (the subscription level). In accordance with another aspect of the present invention, the monitor is a bandwidth regulator. The bandwidth regulator observes the amount of throughput consumed within a sliding window of time and chooses a snoop type that requests data only when the measured throughput is below a threshold. The throughput that is measured is the throughput of snoop responses. In accordance with an aspect of the present invention, the monitor monitors the rate of initiator requests. The rate is measured within a sliding window of time. In another embodiment, the monitor monitors the latency (time) from snoop requests to snoop responses. In another embodiment, the monitor monitors the latency (time) from a request is received from an initiator until a corresponding response is sent to the initiator. In accordance with another aspect of the present invention, the monitor monitors the fullness level of a FIFO to determine the type of snoop to send to each of one or more caches in the system.

Figure 2:
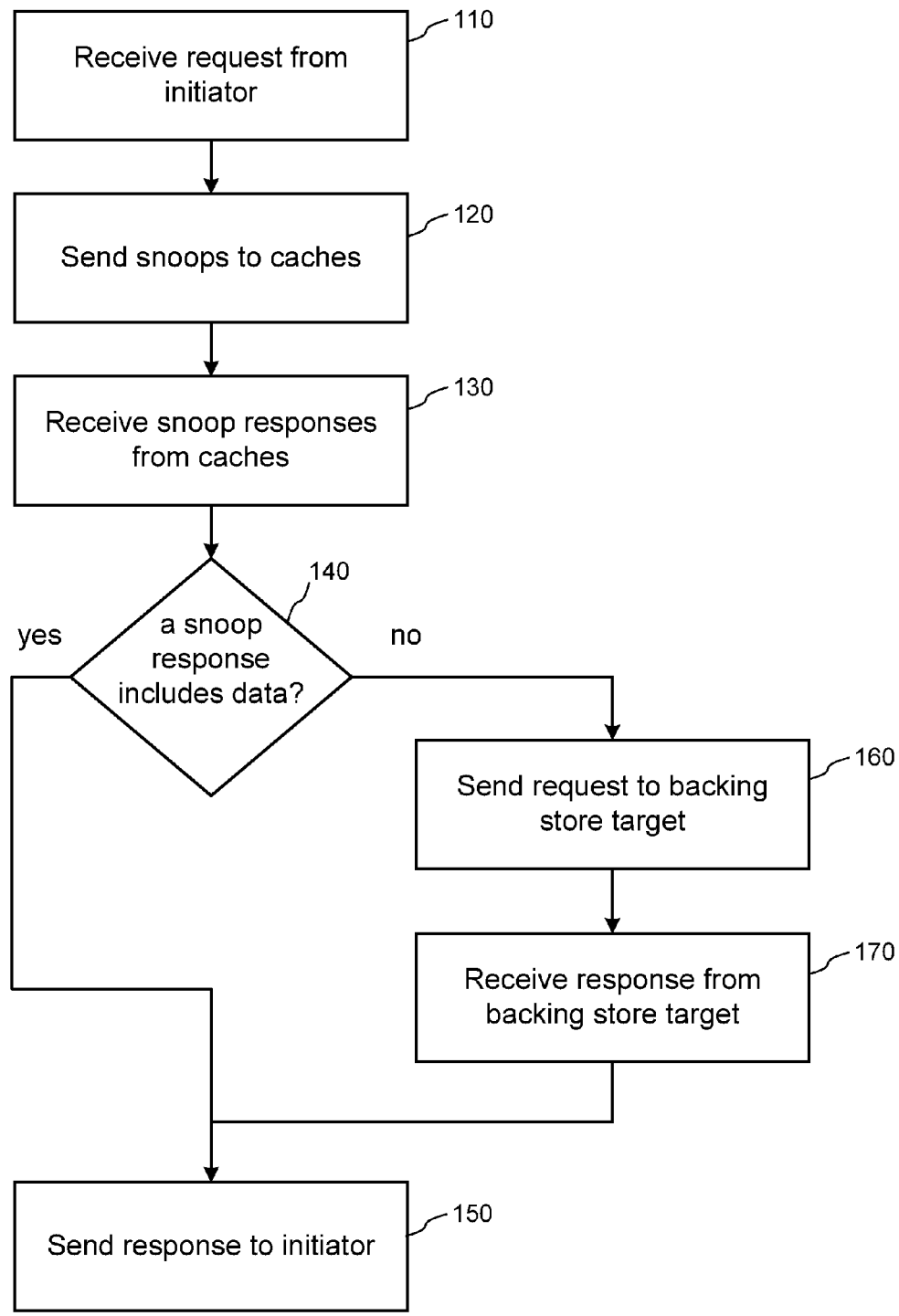
FIG. 2 illustrates the process of the cache controller coherently servicing requests from an initiator in accordance with the teachings and various aspects of the present invention.

Referring now to FIG. 1 and FIG. 2, in accordance with the various aspects of the present invention, the coherency controller 20 performs the following steps to complete a coherent request. At step 110, the coherency controller 20 of FIG. 1 receives a request from initiator 30. At step 120, the coherency controller 20 sends a snoop to the cache of each coherent initiator 50. At step 130, the coherency controller 20 receives a snoop response from each cache of the coherent initiators 50. At step 140 if a snoop response includes data, then the coherency controller 20 proceeds to step 150 and sends a response to the initiator 30. In step 140, if no snoop response includes data, then the coherency controller 20 proceeds to step 160 and sends a request to the backing store target, such as the target 60. Step 160 leads to step 170, in which the coherency controller 20 receives a response from the target 60 and proceeds to step 150, and sends a response to the initiator 30.

In accordance with various aspects of the present invention, in some coherency protocols there are different types of snoop requests and these different types can be used to indicate to the snooped initiator caches of the coherence initiators 50 any of the following: if the snoop should send data back; if initiator caches of the coherence initiators 50 have the data; or if initiator caches of the coherence initiators 50 should refrain from sending data if they know the data to be correct in the backing store, such as the target 60 (the cache line is not in a modified state in the cache).

In many cases, snoop requests indicate that data should be returned if possible. In this case, some specialized types of snoop requests may be used to indicate that no data is preferred. For instance, cache maintenance snoop requests are not meant to ask for data and may be used for that purpose.

According to other aspects of the present invention, the coherent initiators 50 use the AMBA ACE protocol. In response to an I/O coherent read request from initiator 30 (e.g. a ReadOnce request type coming from an AMBA ACE or AMBA ACE-Lite initiator), a conventional controller would send the ReadOnce snoop type, which is likely to return if the snooped coherent agent had that data in its cache. According to one aspect of the present invention, the coherency controller 20 makes the choice between a ReadOnce snoop type (which is likely to return data if the data is available) and a CleanShared snoop type (which is less likely to return data). In response to a read from the initiator 30 with intent to deallocate from caches of the coherent initiators 50 or an AMBA ACE ReadUnique request type, a conventional controller would send a snoop of ReadUnique type, which is likely to return data if the snooped coherent agent had that data in its cache. According to another aspect of the present invention, the coherency controller 20 makes the choice between a ReadUnique snoop type (which is likely to return data if the data is available) and a CleanInvalid snoop type (which is less likely to return data).

In sequential snooping controllers, the snoops are first sent to the coherent initiators 50 and their snoop response received. If the snoop response does not include data, the snoop controller sends a request to the backing store, such as the target 60, to obtain the data.

The various aspects of the present invention may be implemented in software, hardware, application logic, or a combination of software, hardware, and application logic. The software, application logic and/or hardware may reside on a server, an electronic device, or a service. If desired, part of the software, application logic and/or hardware may reside on an electronic device, part of the software, application logic and/or hardware may reside on a server.

As will be apparent to those of skill in the art upon reading this disclosure, each of the aspects described and illustrated herein has discrete components and features which may be readily separated from or combined with the features and aspects without departing from the scope or spirit of the present invention. Any recited method can be carried out in the order of events recited or in any other order which is logically possible.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

In accordance with the teaching of the present invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that includes a series of instructions, such as computer readable program steps or code encoded therein. In certain aspects of the present invention, the non-transitory computer readable medium includes one or more data repositories. Thus, in certain embodiments and in accordance with any aspect of the present invention, computer readable program code (or code) is encoded in a non-transitory computer readable medium of the computing device. The processor, in turn, executes the computer readable program code to create or amend an existing computer-aided design using a tool. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the present invention, is implemented in a variety of ways:

with one or more distinct processors or microprocessors, volatile and/or non-volatile memory and peripherals or peripheral controllers;

with an integrated microcontroller, which has a processor, local volatile and non-volatile memory, peripherals and input/output pins;

discrete logic which implements a fixed version of the article of manufacture or system;

programmable logic which implements a version of the article of manufacture or system which can be reprogrammed either through a local or remote interface. Such logic could implement either a control system either in logic or via a set of commands executed by a soft-processor.

In certain embodiments, the system includes a hardware-based module (e.g., a digital signal processor (DSP), a field programmable gate array (FPGA)) and/or a software-based module (e.g., a module of computer code, a set of processor-readable instructions that are executed at a processor). In some embodiments, one or more of the functions associated with the system 100 is performed, for example, by different modules and/or combined into one or more modules locally executable on one or more computing devices.

Accordingly, the preceding merely illustrates the various aspects and principles of the present invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the various aspects discussed and described herein. Rather, the scope and spirit of present invention is embodied by the appended claims.

What is claimed is:

1. A method of issuing snoop requests from a coherency controller comprising:

receiving an initiator request of one type of a plurality of types of initiator requests; determining the one type of the initiator request based on an attribute of the initiator request selected from the group consisting of: an opcode of the initiator request, an identity of an initiator of the initiator request, and a user bit of the initiator request that indicates that the initiator of the initiator request knows itself to be a last consumer of a cache line;

sending at least one snoop request to one or more caches in order to service the initiator request;

measuring an amount of throughput of snoop responses consumed within a sliding window of time to obtain a measured throughput within the sliding window of time; and making a choice between a plurality of types of snoop requests that can be issued for the at least one snoop request in response to the one type of the initiator request and the measured throughput within the sliding window of time, wherein a first type selected from the plurality of types of snoop requests causes data held by the one or more caches to be included in a snoop response and a second type selected from the plurality of types of snoop requests causes the snoop response to contain no data.

2. The method of claim 1 wherein the choice is based on a programmable register.

3. The method of claim 1 wherein the choice is based on an initiator identity of the initiator request.

4. The method of claim 1 wherein the choice is based on a clock frequency.

5. The method of claim 1 further comprising: monitoring for a value; and basing the choice upon the value.

6. The method of claim 5 wherein the at least one snoop request is a type of snoop request to which a response can include data if the value is below a threshold.

7. The method of claim 5 wherein the value is a snoop subscription level.

8. The method of claim 5 wherein the value is a throughput of snoops.

9. The method of claim 5 wherein the value is a snoop latency.

10. The method of claim 5 wherein the value is a rate of initiator requests.

11. The method of claim 5 wherein the value is an initiator request latency.

12. The method of claim 1, further comprising: choosing the first type of the plurality of types of snoop requests for the at least one snoop request only when the measured throughput is below a threshold, wherein the first type is a type of snoop request that requests data.

13. The method of claim 1, wherein there is a one-to-one mapping of the plurality of types of initiator requests to the plurality of types of snoop requests that can be issued.

14. The method of claim 1, wherein first and second types of snoop request each include a type of snoop request selected from the group consisting of: a type that indicates to the one or more caches whether the one or more caches should send data back in response to the at least one snoop request, a type that indicates to the one or more caches whether the one or more caches has the data, a type that indicates to the one or more caches whether the one or more caches should refrain from sending the data if the one or more caches knows the data to be correct in a backing store, a type that indicates to the one or more caches that data should be returned if possible, and a type that indicates to the one or more caches that no data is preferred.

15. A system comprising:
an initiator;
a coherent initiator; and
a coherency controller in communication with the initiator and the coherent initiator, the coherency controller comprising:
a snoop response monitor configured to measure an amount of throughput of snoop responses consumed within a sliding window of time to obtain a measured throughput within the sliding window of time; and
a snoop controller configured to:
receive an initiator request from the initiator, wherein the initiator request is of one type of a plurality of types of initiator requests;
determine the one type of the initiator request based on an attribute of the initiator request selected from the group consisting of: an opcode of the initiator request, an identity of the initiator, and a user bit of the initiator request that indicates that the initiator knows itself to be a last consumer of a cache line;
send at least one snoop request to the coherent initiator to service the initiator request;
make a choice between a plurality of types of snoop requests that can be issued for the at least one snoop request in response to the one type of the initiator request and the measured throughput within the sliding window of time, wherein a first type selected from the plurality of types of snoop requests causes data held by a cache of the coherent initiator to be included in a snoop response and a second type selected from the plurality of types of snoop requests causes the snoop response to contain no data.

* * * * *